United States Patent
Takabayashi (10) Patent No.: US 11,422,417 B2
(45) Date of Patent: Aug. 23, 2022

(54) ELECTRO OPTICAL DEVICE INCLUDING ELECTRO OPTICAL PANEL HOUSED IN FRAME WITH INSULATION MEMBER

(71) Applicant: Japan Display Inc., Tokyo (JP)

(72) Inventor: Kazunori Takabayashi, Okaya (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 17/241,368

(22) Filed: Apr. 27, 2021

(65) Prior Publication Data

US 2021/0247649 A1     Aug. 12, 2021

Related U.S. Application Data (63) Continuation of application No. 16/511,822, filed on Jul. 15, 2019, now Pat. No. 11,042,067, which is a continuation of application No. 15/353,242, filed on Nov. 16, 2016, now Pat. No. 10,353,255, which is a continuation of application No. 14/313,579, filed on Jun. 24, 2014, now Pat. No. 9,529,219, which is a continuation of application No. 12/179,229, filed on Jul. 24, 2008, now Pat. No. 8,797,473.

(30) Foreign Application Priority Data

Sep. 12, 2007    (JP) ................... 2007-236286
May 30, 2008    (JP) ................... 2008-142235

(51) Int. Cl.
*G02F 1/1362*     (2006.01)
*G02F 1/13357*    (2006.01)
*G02F 1/1333*     (2006.01)
*G02F 1/1345*     (2006.01)
*G02F 1/133*      (2006.01)
*G02F 1/1335*     (2006.01)

(52) U.S. Cl.
CPC .... *G02F 1/136204* (2013.01); *G02F 1/13306* (2013.01); *G02F 1/13452* (2013.01); *G02F 1/133308* (2013.01); *G02F 1/133314* (2021.01); *G02F 1/133317* (2021.01); *G02F 1/133528* (2013.01); *G02F 1/133608* (2013.01); *G02F 1/133331* (2021.01); *G02F 1/133334* (2021.01); *G02F 2202/22* (2013.01)

(58) Field of Classification Search
CPC combination set(s) only.
See application file for complete search history.

(56) References Cited

U.S. PATENT DOCUMENTS 5,835,179 A    11/1998    Yamanaka
6,583,831 B2    6/2003    Kim
(Continued)

FOREIGN PATENT DOCUMENTS

JP       11-295712     10/1999
JP       2002-333607   11/2002
(Continued)

*Primary Examiner* — Lauren Nguyen
(74) *Attorney, Agent, or Firm* — K&L Gates LLP (57) ABSTRACT

An electro-optical device includes a frame including a conduction part and a resin part, an electro-optical panel that is housed in the inner side of the resin part, and an exposure part that is formed by exposing the conduction part from the resin part. The exposure part is disposed to face at least a part of an end face of the electro-optical panel or protrude from a surface of the electro-optical panel over the end face.

15 Claims, 8 Drawing Sheets

(56) References Cited

U.S. PATENT DOCUMENTS

| | | |
|---|---|---|
| 7,271,861 B2 | 9/2007 | Yamazaki |
| 7,324,172 B2 | 1/2008 | Yamazaki |
| 7,423,704 B2 | 9/2008 | Cho et al. |
| 2002/0159001 A1 | 10/2002 | Kim |
| 2006/0119760 A1* | 6/2006 | Okuda .................. H05K 1/147 349/58 |
| 2009/0004408 A1* | 1/2009 | Nakanishi ......... G02F 1/133308 428/12 |
| 2009/0011197 A1* | 1/2009 | Matsuhira ......... G02F 1/133308 428/192 |

FOREIGN PATENT DOCUMENTS

| | | |
|---|---|---|
| JP | 2004-240239 | 8/2004 |
| JP | 2006-11163 | 1/2006 |
| JP | 2006-53532 | 2/2006 |
| JP | 2006-350216 | 12/2006 |
| JP | 2006-350217 | 12/2006 |

* cited by examiner

ELECTRO OPTICAL DEVICE INCLUDING ELECTRO OPTICAL PANEL HOUSED IN FRAME WITH INSULATION MEMBER

CROSS REFERENCES TO RELATED APPLICATIONS

This application is a continuation of Ser. No. 16/511,822, filed on Jul. 15, 2019, which is a continuation of U.S. patent application Ser. No. 15/353,242, filed on Nov. 16, 2016, and issued as U.S. Pat. No. 10,353,255 on Jul. 16, 2019, which application is a continuation of U.S. patent application Ser. No. 14/313,579, filed on Jun. 24, 2014, and issued as U.S. Pat. No. 9,529,219 on Dec. 27, 2016, which application is a continuation of U.S. patent application Ser. No. 12/179,229, filed Jul. 24, 2008, and issued as U.S. Pat. No. 8,797,473 on Aug. 5, 2014, and claims priority to Japanese Priority Patent Application No. 2008-142235, filed in the Japan Patent Office on May 30, 2008, and Japanese Priority Patent Application No. 2007-236286, filed in the Japan Patent Office on Sep. 12, 2007, the entire contents of which are hereby incorporated by reference.

BACKGROUND

The present invention relates to an electro-optical device and an electronic apparatus.

When a human body or an object that is electrically charged approaches or is brought into contact with an electro-optical device such as a liquid crystal panel, static electricity is penetrated into the inside from the surface of the liquid crystal panel, and a driving IC, a switching element, or the like may be damaged. In order to reduce adverse affect of the static electricity on the liquid crystal panel, in JP-A-2006-350216, a configuration in which a frame member made of a metal is fixed to the side face of a casing frame made of a resin, in which a liquid crystal panel is installed by using a screw, a metallic rear face member is fixed to the bottom face by using a screw, and static electricity is transmitted by using the screws as earth paths has been disclosed. In addition, in JP-A-2006-350217, a configuration in which an earth clasp is provided and an earth path is formed by connecting the earth clasp to a rear face member, which is disposed at the bottom of a casing frame made of a resin, made of a metal has been disclosed.

However, in a general electro-optical device, a casing frame made of a resin and a member made of metal are provided separately and the casing frame and the member are fixed by screws, and accordingly, the number of components increases. In addition, since the electro-optical device is configured by combining many components, it is difficult to miniaturize the electro-optical device. In particular, there is a problem that it is difficult to decrease the thickness of the electro-optical device.

SUMMARY

An advantage of some aspects of the invention is that an electro-optical device capable of preventing damages of a driving IC, a switching element, and the like due to penetration of static electricity into the electro-optical panel is implemented by using a small number of components and a decreases of the electro-optical device in size and thickness is implemented.

According to a first aspect of the invention, there is provided an electro-optical device including: a frame including conduction part and a resin part; an electro-optical panel that is housed in the inner side of the resin part; and an exposure part that is formed by exposing the conduction part from the resin part, and the exposure part is disposed to face at least a part of an end face of the electro-optical panel or protrude from a surface of the electro-optical panel over the end face. In the electro-optical device, the conduction part may be configured to be exposed in an edge of the frame. As the conduction. part, a metal plate disposed along the end face of the electro-optical panel may be used in addition, in order to form the resin part and the metal part integrally, the metal plate is configured to be insert-molded into the resin material.

In the electro-optical panel, for example, wirings of scanning lines and signal lines that are connected to switching elements such as TFTs, lead-out wirings connected thereto, terminals connected to a driving circuit, and the like are formed. When discharge occurs due to static electricity caused by a user or the like, the static electricity propagates through the surface of the electro-optical panel, and is penetrated into the inside of the electro-optical panel from the end face. The static electricity that has been penetrated into the inside of the electro-optical panel flows into the driving circuit or the switching element through the above-described wirings and terminals to cause damages thereof.

According to the above-described aspect of the invention, the static electricity that has propagated though the surface of the electro-optical panel can be more easily discharged to the frame than the end face of the electro-optical panel in particular, by exposing the conduction part in the edge of the frame on the surface side of the electro-optical panel, discharge can be easily occur in the frame. That is because, generally, static electricity can be easily discharged toward a part that thinly protrudes.

In the above-described electro-optical device, the exposure part may be disposed to face at least a part of an end face of the electro-optical panel or protrude from a surface of the electro-optical panel over the end face of the electro-optical panel. it is preferable that the front end part of the exposed conduction part does not protrude from the surface of the electro-optical panel for decreasing the electro-optical device in size and thickness. In order to discharge more easily, the front end part of the exposed conduction part is configured to protrude from the surface of the electro-optical panel. That is because the exposed part that protrudes from the surface of the electro-optical panel serves as a lightning load and can absorb the static electricity more easily.

Moreover, by connecting a conduction body to the ground, that is, a reference electric potential, discharge in the frame can occur more easily. For example, the conduction body of the frame is configured to be connected to the ground terminal of the driving circuit mounted on the electro-optical device, or the conduction body of the frame may be configured to be brought into contact with the casing of an electronic apparatus to which the electro-optical device is installed.

In the above-described electro-optical device, the static electricity can be directly discharged to the conduction part of the frame. In other words, an additional member for acquiring a discharge path is not needed, and accordingly, damages of the electro-optical panel due to the static electricity can be prevented without increasing the number of components at all.

When the frame is configured by integrally forming the resin part and the metal plate, there is no member such as a screw that can be used as a discharge path.

Accordingly, in such a case, the configuration according to this aspect is particularly effective. In addition, since the resin part and the metal part are integrally formed, the number of the components can be decreased further, and thereby the electro-optical device can be decreased in size and thickness. Moreover, by integrally forming the metal plate and the resin material, a reinforced integrated frame can be formed. As a result, peel-off of the resin and the metal plate can be prevented, and the strength of the frame for bending can be increased. By increasing the strength for peel-off, penetration of the static electricity into the electro-optical panel can be prevented assuredly, and an unnecessary indirect propagation of the static electricity due to peel-off and the like can be prevented.

In addition, the resin part may be disposed on the corners of the frame at the bottom part of the metal plate. in such a case, when the electro-optical panel is installed to the frame, the end face of the electro-optical device is brought into contact with the corner parts. Thus, the frame and the end face of the electro-optical panel are brought into contact with not the metal but the resin part, and accordingly, insulation is maintained and damages such as cracks do not occur in the electro-optical device. Thereby, the strength of the electro-optical panel for cracks can be improved. In the resin part disposed on the corners of the frame, protrusion parts that protrude to the outside of the four corners of the frame may be formed. In such a case, when the electro-optical device is installed to an electronic apparatus or the like, the protrusion parts serve to determine the positions of the electro-optical device, and accordingly, assembly can be performed in an easy manner.

In the above-described electro-optical device, penetration of the static electricity into the electro-optical panel can be prevented in a case where the exposed conduction part and the end face of the electro-optical panel are insulated or conducted.

For example, when a gap is formed between the end face of the electro-optical panel and the exposed conduction part or an insulation member having insulation higher than the substrate of the surface of the electro-optical panel is filled in between the end face of the electro-optical panel and the exposed conduction part, the conduction part and the electro-optical panel are insulated from each other more assuredly. Accordingly, static electricity that has flown through the frame does not return to the electro-optical panel.

On the other hand, when the end face of the electro-optical panel and the exposed conduction part are brought into contact with each other or a conduction member having conductivity higher than the substrate of the surface of the electro-optical panel is filled in, the static electricity accumulated in the electro-optical panel can be transmitted to the frame more easily.

In other words, in any of the above-described cases, the static electricity is not accumulated in the electro-optical panel.

In the above-described electro-optical device, an edge of the metal plate may be bent in the side part toward the electro-optical panel side.

In such a case, the strength of the edge of the metal plate is improved, and mechanical strength of the frame can be improved. In addition, by bending the edge of the metal plate toward the electro-optical panel side, the precision of the size of the metal plate on the outer side of the frame can be improved.

In the above-described electro-optical device, the edge of the metal plate may be bent in the side part toward a side opposite to the electro-optical panel.

In such a case, the strength of the edge of the metal plate is improved, and mechanical strength of the frame can be improved. In addition, by bending the edge of the metal plate toward a side opposite to the electro-optical panel side, the precision of the size of the metal plate on the inner side of the frame can be improved.

The above-described electro-optical device may further includes a driving circuit that drives the electro-optical panel and a conductive protection member that covers at least a part of the driving circuit, and the protection member may be connected to the conduction part of the frame.

In such a case, the static electricity discharged in the edge part of the electro-optical panel is penetrated into the conductive protection member. In addition, since the protection member and the driving circuit are insulated from each other, it can be prevented that the static electricity that has been penetrated into the protection member is penetrated into the driving circuit. Thereby, the driving circuit can be protected from being damaged due to the static electricity.

According to a second aspect of the invention, there is provided an electro-optical apparatus including any one of the above-described electro-optical devices.

In such a case, damages of the electronic apparatus due to the static electricity can be prevented, and thus, an electro-optical device that is formed thinner than a general electro-optical device is installed thereto. Consequently, according to this aspect, damages due to static electricity are prevented, and thereby an electronic apparatus that is formed thinner than a general electronic apparatus can be provided.

The above-described electronic apparatus may further include a casing that houses the electro-optical device, and the electro-optical device is brought into contact with the casing through the conduction part.

In such a case, the static electricity that is generated from the surface of the electronic apparatus and penetrated into the casing is led to the conduction part. Accordingly, penetration of the static electricity to the electro-optical panel can be prevented.

DETAILED DESCRIPTION

Embodiments of the present application will be described below in detail with reference to the drawings.

First Embodiment

Hereinafter, a first embodiment of the present invention will be described with reference to the accompanying drawings. In the drawings described below, in order to set each constituent member to a size recognizable in the drawings, the scale is appropriately changed for each constituent member.

Liquid Crystal Display Device

Figure 1:
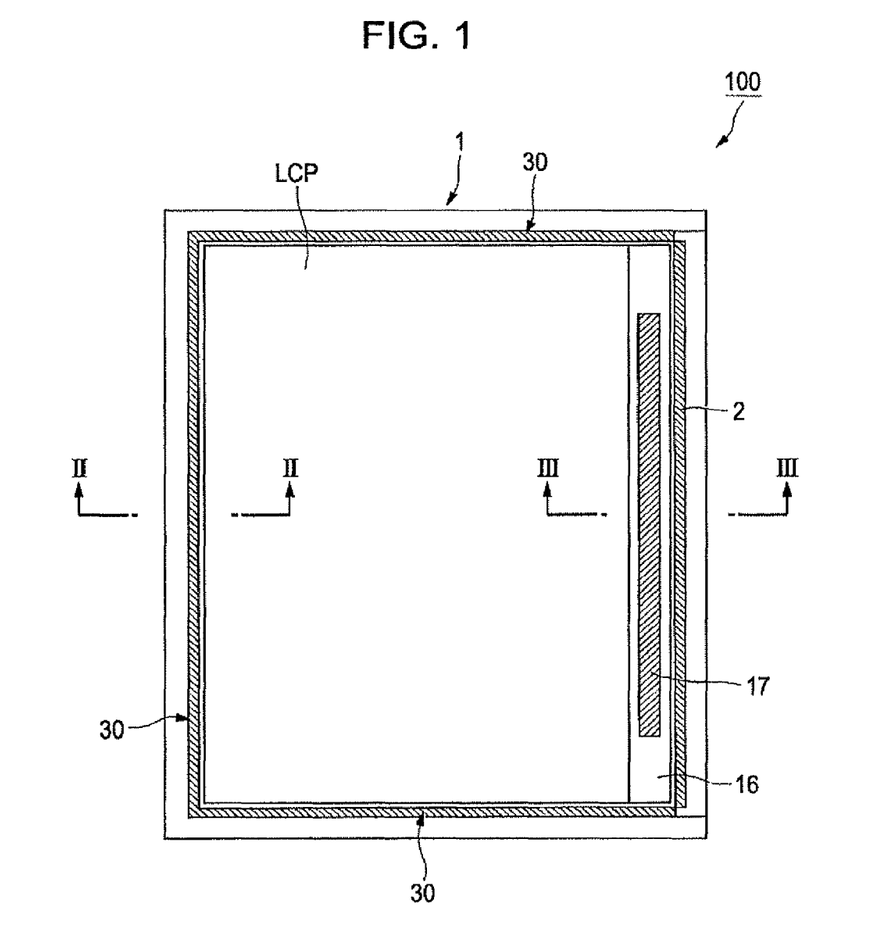
FIG. 1 is a plan view of a liquid crystal display device according to a first embodiment of the invention.
Figure 2:
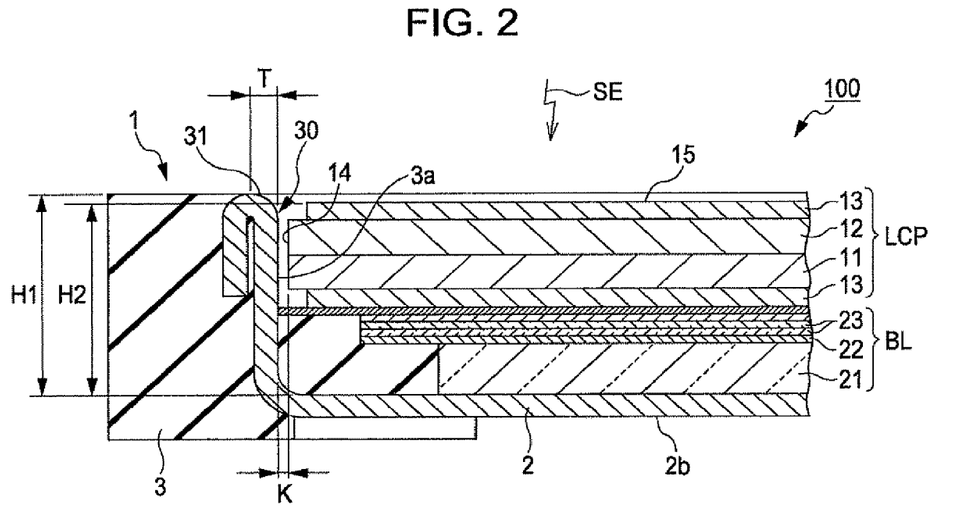
FIG. 2 is a cross-section view taken along line II-II shown in FIG. 1.
Figure 3:
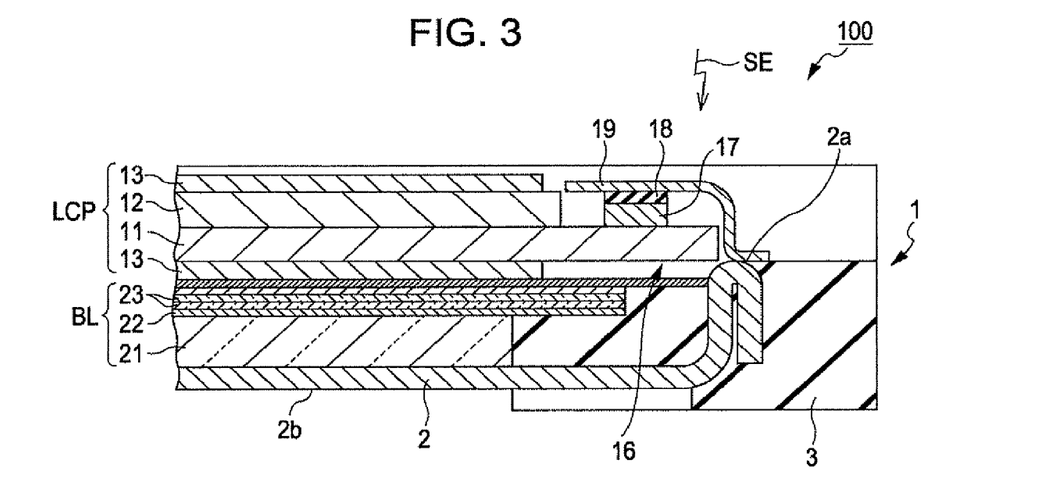
FIG. 3 is a cross-section view taken along line III-III shown in FIG. 1.

FIG. 1 is a plan view of a liquid crystal display device 100 (electro-optical device). FIG. 2 is a cross-section view taken along line II-II shown in FIG. 1. FIG. 3 is a cross-section view taken along line III-III shown in FIG. 1.

As shown in FIG. 1, the liquid crystal display device 100 has a frame 1 having a general frame shape. In the frame 1, a liquid crystal panel LCP is housed.

The frame 1, as shown in FIGS. 2 and 3, is formed by a base part of the frame 1, a metal plate 2 that configures a frame core of the periphery of the frame 1, and a resin part 3 that configures a casing of the periphery of the frame 1 as an insulation part. The frame 1 is integrally formed by insert-molding the metal plate 2 into the resin part 3. The metal plate 2, for example, is formed of a metal material such as stainless steel, and the resin part 3 is formed of a resin material such as polycarbonate.

The edge of the metal plate 2 forms a side part that is bent to rise vertically toward the surface side (viewing side) of the liquid crystal panel LCP of the liquid crystal display device 100 in correspondence with the shape of a cross-section of the resin part 3 which has the shape of an approximate letter "L". The edge of the metal plate 2 is bent to be returned to the further outer side, and so-called a Hemming processing is performed for the edge of the metal plate.

The inner side of the resin part 3 of the frame 1 is formed in the shape having multiple levels in accordance with the sizes and shapes of a luminance device BL and the liquid crystal panel LCP. The luminance device BL and the liquid crystal panel LCP are housed in the inner side of the resin part 3.

The luminance device BL includes a light guiding plate 21, a diffusion sheet 22, and a prism sheet 23, and a light source, a reflection sheet, and the like that are not shown in the figure. The luminance device BL is configured to introduce light from the light source into the liquid crystal panel LCP.

The liquid crystal panel LCP includes a pair of substrates 11 and 12 facing each other. Between the substrates 11 and 12, a liquid crystal layer (not shown) is enclosed. The periphery of the liquid crystal layer is sealed by a sealing member that bonds the substrates 11 and 12 together. On the liquid crystal layer side of one substrate 11, a pixel electrode, a TFT, a. wiring, and the like are formed, in addition, on the liquid crystal layer side of the other substrate 12, a common electrode, a wiring, and the like are formed. In addition, on sides opposite to the liquid crystal layers of the substrates 11 and 12, polarizing plates 13 and 13 are fixed.

As shown in FIG. 2, a part (side part) of the edge of the metal plate 2 bent toward the side of the surface 15 of the liquid crystal panel LCP is exposed to an inner side 3a of the resin part 3 which opposes an end face 14 of the liquid crystal panel LCP in the thickness direction. An exposed part of the conduction part 30 of the metal plate 2 is formed as an exposure part. The conduction part 30 is formed along the end face 14 of the liquid crystal panel LCP.

A height H1 from the metal plate 2 located at the bottom of the frame 1 to an end edge 31 of the conduction part 30 on the surface 15 side of the liquid crystal panel LCP is formed to be larger than a height H2 of the liquid crystal panel LCP from the metal plate 2 to the surface 15 of the liquid crystal panel LCP. Accordingly, the end edge 31 of the conduction part 30 is formed to protrude to the viewing side from the surface 15 of the liquid crystal panel LCP.

Between the conduction part 30 and the liquid crystal panel LCP, for example, a gap K of about 0.2 mm is formed. In addition, to a bottom face 2b of the metal plate 2, a wiring having a ground electric potential is connected, and the conduction part 30 that is a part of the metal plate 2 is in a ground state. The bottom face 2b of the metal plate 2 may be brought into contact with a casing, which is not shown in the figure, having a ground electric potential. Moreover, a ground terminal of a driving circuit that is mounted in the electro-optical device may be brought into contact with the metal plate 2.

As shown in FIGS. 1 and 3, in the edge part of the liquid crystal panel LCP, an extension part 16 that is installed by extending the substrate 11 of the liquid crystal panel LOP is formed. In the extension part 16, for example, a terminal (not shown) to which an external connection substrate such as an FPC is connected and the like are disposed. In addition, a driving IC 17 that drives the TFT of the substrate 11 and the like is disposed in the extension part 16. An adhesive tape 18 that is formed by an insulation material is adhered to the driving IC 17, and a conduction sheet 19 as a protection member is fixed to the driving IC 17 by the adhesive tape 18. The conduction sheet 19 is, for example, formed of a material such as Al having conductivity and is disposed to cover the driving IC 17 of the extension part 16. The conduction sheet 19 is electrically connected to an end edge 2a of the metal plate 2 on the surface 15 side which is bent to the surface 15 side of the liquid crystal panel LCP by an adhesive agent having the conductivity and the like.

As described above, edges of four sides that rise approximately vertically from the bottom face of the metal plate 2 is configured such that end edges 31 are formed to protrude from the surface 15 of the liquid crystal panel LCP on three sides and an end edge 2a is formed to bent to a position lower than the surface 15 of the liquid crystal panel LCP on one side.

The end edge 31 that protrudes from the surface 15 of the liquid crystal panel LCP may be configured on four sides, two sides, or only one side. In addition, the end edge 31 that protrudes from the surface 15 of the liquid crystal panel LCP may be configured in a part of one side. Furthermore, in order to prevent penetration of static electricity, the protruded end edge 31 part may be configured to be bent to be covered with the surface 15 of the liquid crystal panel LCP with facing the end face of the electro-optical panel.

Next, an operation of this embodiment will be described.

As shown in FIG. 2, static electricity SE that is discharged to the observation side of the liquid crystal display device 100 tries to penetrate into the surface 15 of the liquid crystal panel LCP. Here, on the inner side 3a of the resin part 3 disposed along the end face 14 of the liquid crystal panel LCP in the thickness direction, the conduction part 30 formed of a conductive material is disposed. The static electricity SE penetrates into the exposure part of the conduction part 30 which has conductivity higher than the liquid crystal panel LCP. Thus, the static electricity SE is led to the conduction part 30, and accordingly, it is possible to prevent penetration of the static electricity SE into the liquid crystal panel LCP and prevent damage of the liquid crystal panel LCP due to the static electricity SE.

In addition, the end edge 31 of the conduction part 30 which is located on the viewing side is formed to protrude to the viewing side from the surface 15 of the liquid crystal panel LCP which is located on the viewing side. Since static electricity can be easily penetrated into a neighbor part having high conductivity, the static electricity SE generated in the liquid crystal display device 100 on the viewing side is penetrated into the conduction part 30 that is protruded to the viewing side from the surface 15 of the liquid crystal panel LCP. The penetrated static electricity SE flows from the protruded conduction part 30 to the bottom face 2b of the metal plate 2. Then, the static electricity SE flows out to the wiring of a ground electric potential which is connected to the bottom face 2b of the metal plate 2. Accordingly, the static electricity SE generated in the liquid crystal panel LCP on the viewing side is led to be penetrated into the protruded conduction part 30, and thereby the penetration of the static electricity SE into the liquid crystal panel LCP can be prevented in advance. The conduction part 30 may be configured not protrude to the viewing side from the surface 15 of the liquid crystal panel LCP. In such a case, discharge can easily occur in the frame by exposing the conduction part in the edge of the frame that is located on the surface side of the electro-optical panel.

In addition, the conduction part 30 is disposed on the inner face 3a of the resin part 3 of the frame 1 along the end face 14 of the liquid crystal panel LCP in the thickness direction. Accordingly, the thickness or width of the liquid crystal display device 100 is not increased due to the thickness T of the conduction part 30, and a screw and the like for fixing the liquid crystal panel LCP are not needed. Thereby, the size and thickness of the liquid crystal display device 100 can be decreased, compared to a general case where a casing frame made of a resin and a metal member are separately provided and the casing frame and the metal member are fixed by using screws.

In addition, since the gap K is formed between the conduction part 30 and the liquid crystal panel LCP, the conduction part 30 and the liquid crystal panel LCP are insulated from each other. Accordingly, it can be prevented that the static electricity SE penetrated into the conduction part 30 is penetrated into the liquid crystal panel LCP.

In addition, the metal plate 2 is brought into contact with and connected to the ground electric potential so as to be grounded. Thus, the conduction part 30 that is a part of the metal plate is also grounded, and accordingly, the static electricity SE penetrated into the conduction part 30 can be transmitted to the outside of the liquid crystal display device 100.

In addition, as shown in FIG. 3, the driving IC 17 of the extension part 16 is covered with the conduction sheet 19, and thus, the static electricity SE that has been discharged in the edge part of the liquid crystal panel LCP is penetrated into the conduction sheet 19. Since the conduction sheet 19 and the driving IC 17 are insulated from each other by the adhesive tape 18 that is formed of an insulation material, it can be prevented that the static electricity SE penetrated into the conduction sheet 19 is penetrated into the driving IC 17. Accordingly, the driving IC 17 can be protected from being damaged due to the static electricity SE. Furthermore, the conduction sheet 19 is electrically connected to the end edge 2a of the grounded metal plate 2 so as to be grounded, and accordingly, the static electricity SE penetrated into the conduction sheet 19 can be transmitted to the outside of the liquid crystal display device 100. As a result, the driving IC 17 can be protected from being damaged due to the static electricity SE more assuredly.

Figure 13:
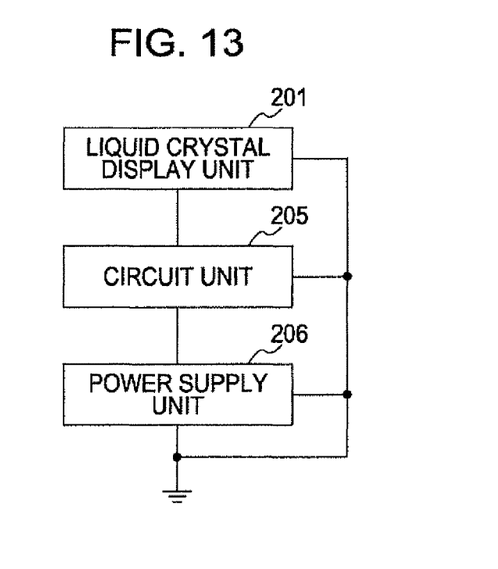
FIG. 13 is a block diagram showing a schematic configuration of a cellular phone according to an embodiment of the invention.

In addition, for example, when the liquid crystal display device 100 is installed to an electronic apparatus such as a cellular phone, a configuration as shown in FIG. 13 is used.

A liquid crystal display unit 201 that is configured by the liquid crystal display device 100 or the like is connected to a circuit unit 205, and the circuit unit 205 is connected to a power supply unit 206. In addition, the liquid crystal display unit 201, the circuit unit 205, and the power supply unit 206 are connected to a wiring having a ground electric potential so as to be grounded.

As described above, the static electricity SE discharged to the observation side of the liquid crystal display device 100 is penetrated into the conduction part 30 and can be transmitted to the outside of the liquid crystal display device 100 through the metal plate 2.

In addition, the ground is wired as a metal plate, a jumper line, a cooper foil, or the like and is electrically connected by soldering, pressure bonding, screw fixing, or the like.

In addition, since the frame 1 is configured by the metal plate 2 and the resin part 3 and the metal plate 2 is insert-molded into the resin part 3, it is possible to improve mechanical strength of the frame 1 by reinforcing the resin part 3 by using the metal plate 2 and decrease the thickness of the frame 1 and the thickness of the liquid crystal display device 100. In addition, since the edge of the metal plate 2 is bent to the outer side of the conduction part 30, the strength of the edge of the metal plate 2 can be improved, whereby the mechanical strength of the frame 1 can be improved. In addition, the precision of the size of the metal plate 2 on the inner side of the frame 1 can be improved by bending the edge of the metal plate 2 to the outside.

As described above, according to the liquid crystal display device 100 of this embodiment, penetration of the static electricity SE into the liquid crystal panel LCP through the conduction part 30 is prevented. Accordingly, damage of the liquid crystal panel LCP due to the static electricity SE can be prevented. in addition, since the thickness T of the conduction part 30 does not have influence on the thickness of the liquid crystal display device 100, a liquid crystal display device 100 that can be formed much thinner than that of a general liquid crystal display device can be provided.

Second Embodiment

Next, a second embodiment of the invention will be described with reference to FIG. 4 with FIGS. 1 and 3 cited. A liquid crystal display device of this embodiment is different from that 100 of the first embodiment that an insulation member INS is filled in the gap K between the conduction part 30 and the liquid crystal panel LCP. Other configurations are the same as those of the first embodiment, and thus, a same reference sign is assigned to a same part, and a description thereof is omitted here.

Figure 4:
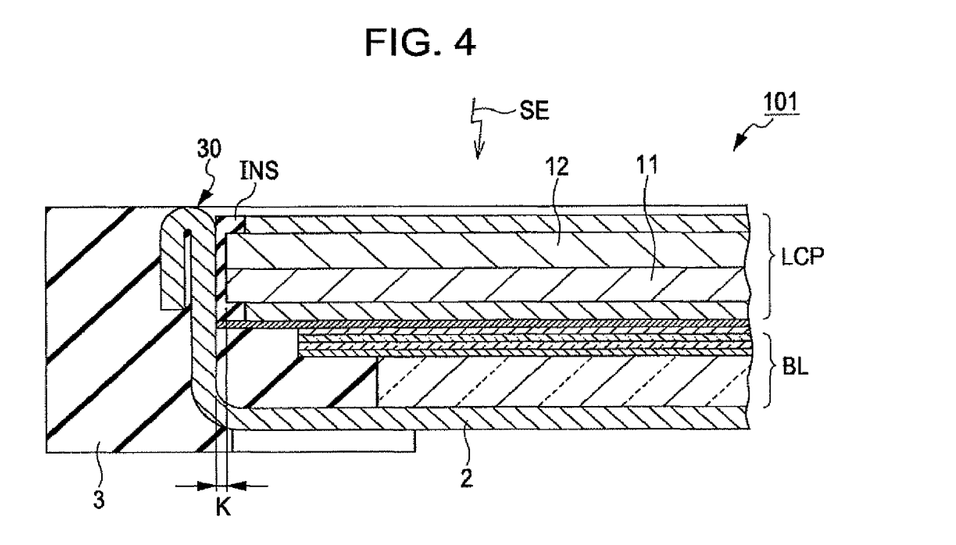
FIG. 4 is a cross-section view of a liquid crystal display device according to a second embodiment of the invention which corresponds to FIG. 2.

As shown in FIG. 4, in a liquid crystal display device 101, in the gap K between the conduction part 30 and the liquid crystal panel LCP, the insulation member INS is filled. For the insulation member INS, for example, a resin material having insulation higher than that of the substrates 11 and 12 of the surface of the liquid crystal panel LCP or the like is used.

The conduction part 30 and the liquid crystal panel LCP are insulated from each other more assuredly by filling the insulation member INS in the gap K between the conduction part 30 and the liquid crystal panel LCP as described above. Accordingly, penetration of the static electricity SE, which has been penetrated into the conduction part 30, into the liquid crystal panel LCP can be prevented more assuredly.

Consequently, according to the liquid crystal display device 101 of this embodiment, the same advantages as those of the liquid crystal display device 100 according to the first embodiment can be acquired. In addition, the penetration of the static electricity SE from the conduction part 30 is prevented more assuredly, and thereby damage of the liquid crystal panel LCP due to the static electricity SE can be prevented more assuredly.

Third Embodiment

Next, a third embodiment of the invention will be described with reference to FIG. 5 with FIGS. 1 and 3 cited. A liquid crystal display device of this embodiment is different from that 100 of the first embodiment that a conduction member ECM is filled in the gap K between the conduction part 30 and the liquid crystal panel LCP. Other configurations are the same as those of the first embodiment, and thus, a same reference sign is assigned to a same part, and a description thereof is omitted here.

Figure 5:
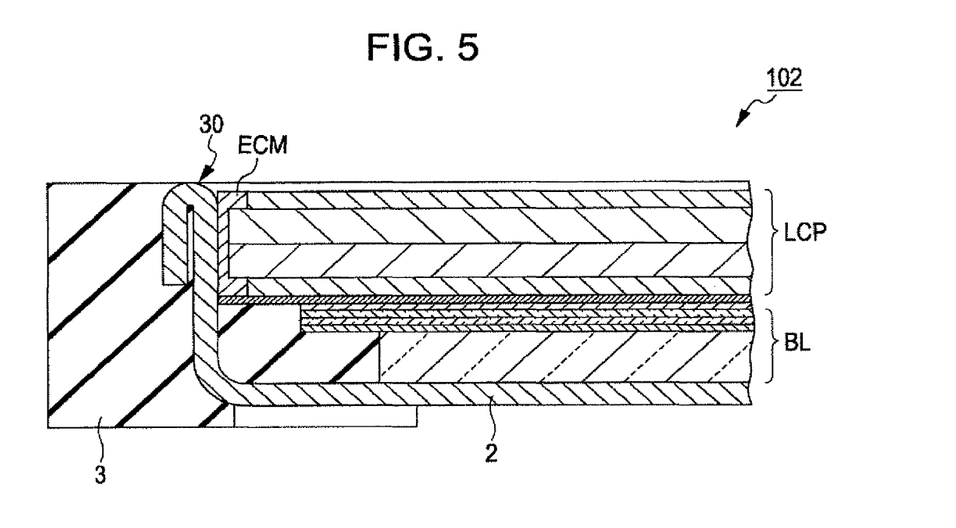
FIG. 5 is a cross-section view of a liquid crystal display device according to a third embodiment of the invention which corresponds to FIG. 2.

As shown in FIG. 5, in a liquid crystal display device 102, in the gap between the conduction part 30 and the liquid crystal panel LCP, the conduction member ECM is filled. For the conduction member ECM, for example, a conduction paste having conductivity higher than that of the substrates 11 and 12 of the surface of the liquid crystal panel LCP or the like is used.

The conduction part 30 and the liquid crystal panel LCP are conducted each other by filling the conduction member ECM in the gap K between the conduction part 30 and the liquid crystal panel LCP as described above. Accordingly, the static electricity SE accumulated in the liquid crystal panel LCP can be transmitted to the conduction part 30 through the conduction member ECM.

Consequently, according to the liquid crystal display device 102 of this embodiment, the same advantages as those of the liquid crystal display device 100 according to the first embodiment can be acquired. In addition, electrically charging the liquid crystal panel LCP can be prevented more assuredly, and thereby damage of the liquid crystal panel LCP due to the static electricity SE can be prevented more assuredly.

Here, the substrate of the surface of the liquid crystal panel includes a polarizing plate, a wavelength plate, a plate having a surface on which a touch panel is added, and a plurality of substrates.

Fourth Embodiment

Hereinafter, a fourth embodiment of the invention will be described with reference to the accompanying drawings. For the liquid crystal parcel LCP and the luminance device BL that have same configurations as those of the above-described embodiments, same reference signs are assigned for descriptions.

Liquid Crystal Display Device

Figure 6:
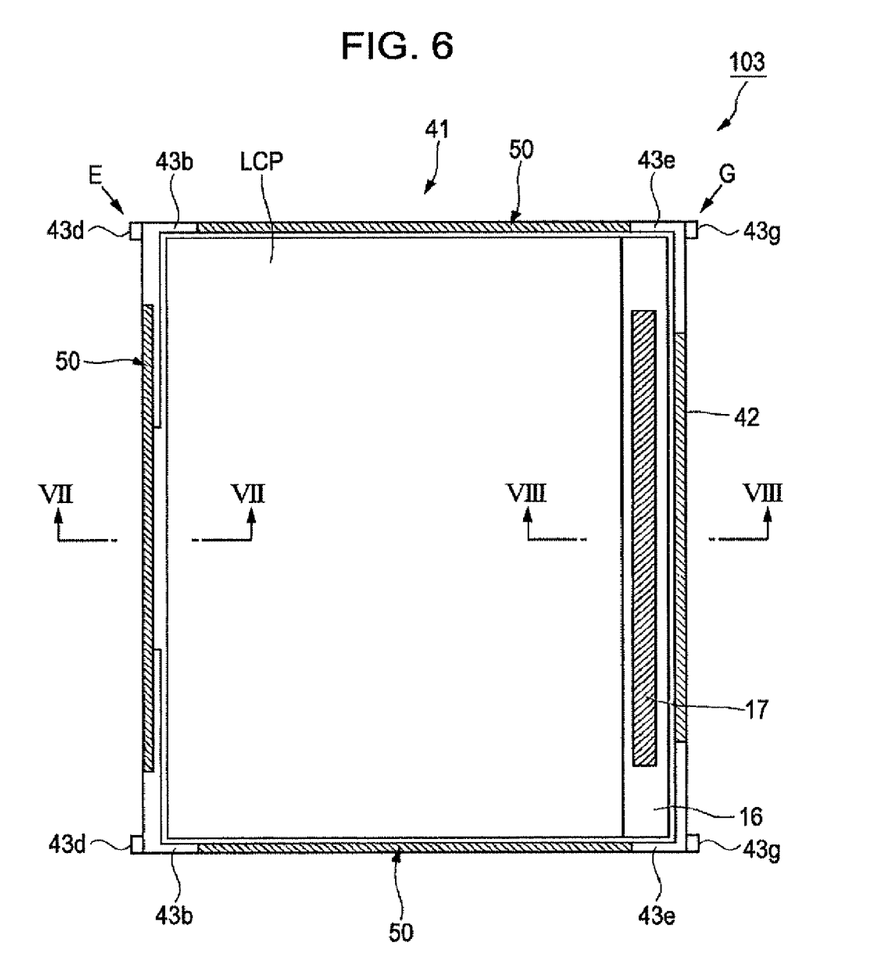
FIG. 6 is a cross-section view of a liquid crystal display device according to a fourth embodiment of the invention.
Figure 7:
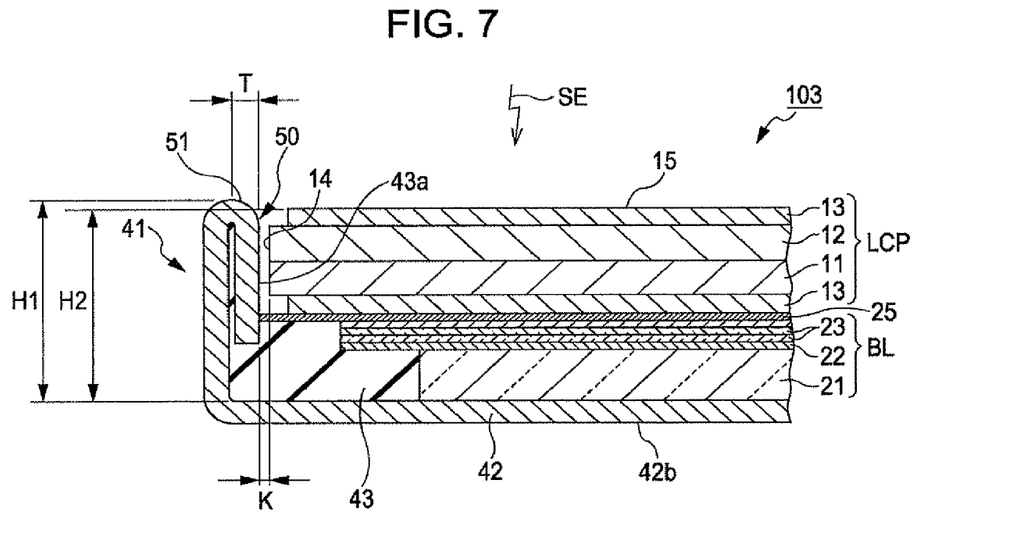
FIG. 7 is a cross-section view taken along line VII-VII shown in FIG. 6.
Figure 8:
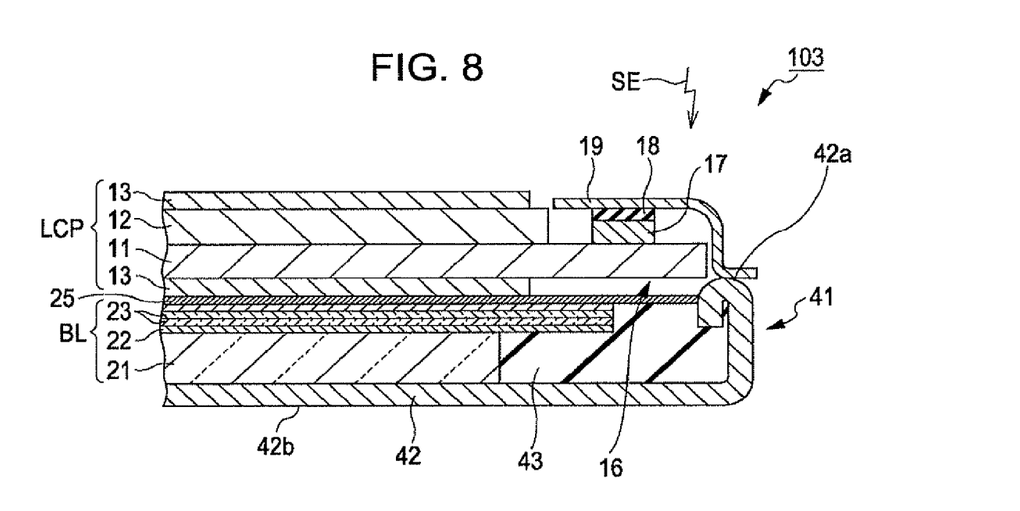
FIG. 8 is a cross-section view taken along line VIII-VIII shown in FIG. 6.
Figure 9:
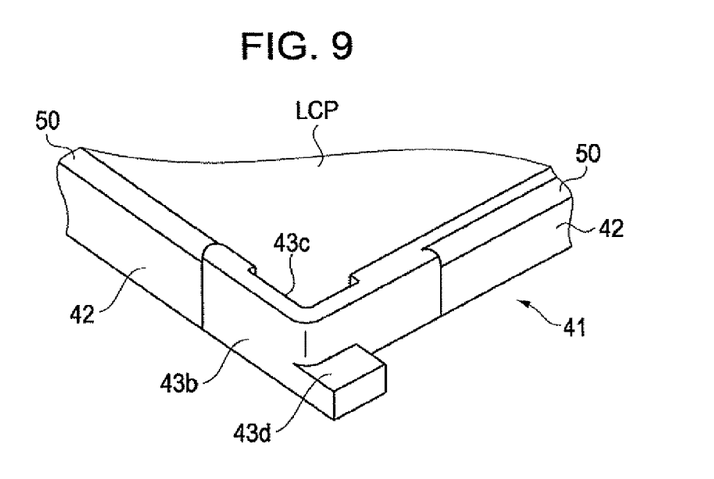
FIG. 9 is a perspective view in the direction of arrow E shown in FIG. 6.
Figure 10:
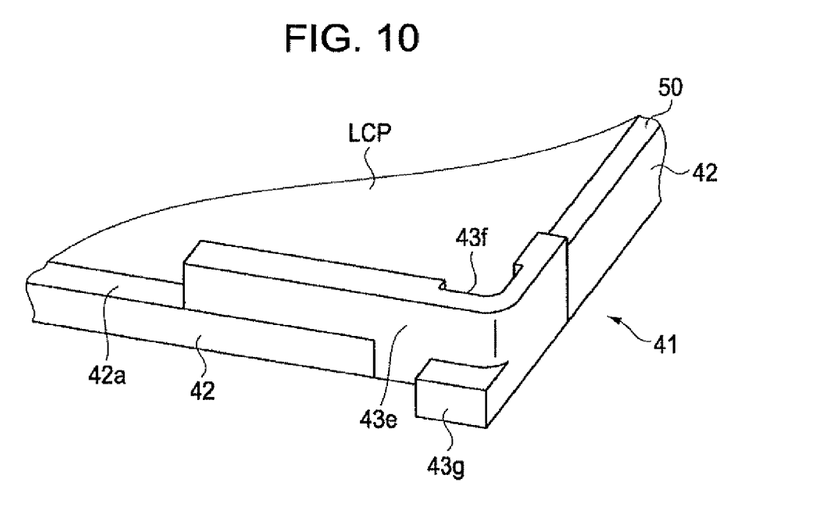
FIG. 10 is a perspective view in the direction of arrow G shown in FIG. 6.

FIG. 6 is a plan view of a liquid crystal display device 103 (electro-optical device). FIG. 7 is a cross-section view taken along line VII-VII shown in FIG. 6. FIG. 8 is a cross-section view taken along line VIII-VIII shown in FIG. 6. In addition, FIG. 9 is a perspective view in the direction of arrow E shown in FIG. 6, and FIG. 10 is a perspective view in the direction of arrow G shown in FIG. 6.

As shown in FIG. 6, the liquid crystal display device 103 has a frame 41 having a general frame shape. In the frame 41, a liquid crystal panel LCP is housed.

The frame 41, as shown in FIGS. 7 and 8, is formed by a base part of the frame 41, a metal plate 42 that configures a frame core of the periphery of the frame 41, and a resin part 43 that configures a casing of the periphery of the frame 41 as an insulation part. The frame 41 is integrally formed by insert-molding the metal plate 42 into the resin part 43. The metal plate 42, for example, is formed of a metal material such as stainless steel, and the resin part 43 is formed of a resin material such as polycarbonate.

The edge of the metal plate 42 forms a. side part that is bent to rise vertically toward the surface side (viewing side) of the liquid crystal panel LCP of the liquid crystal display device 103. The edge of the metal plate 42 is bent to be returned to the inner side that is a side on which the liquid crystal panel LCP is housed.

On the inner side of the frame 41, the resin part 43 is formed in the shape having multiple levels in accordance with the sizes and shapes of a luminance device BL and the liquid crystal panel LCP. The luminance device BL and the liquid crystal panel LCP are housed in the inner side of the frame.

The luminance device BL includes a light guiding plate 21, a diffusion sheet 22, and a prism sheet 23, and a light source, a reflection sheet, and the like that are not shown in the figure. The luminance device is BL is configured to introduce light from the light source into the liquid crystal panel LCP.

The liquid crystal panel LCP includes a pair of substrates 11 and 12 facing each other. Between the substrates 11 and 12, a liquid crystal layer (not shown) is enclosed. The periphery of the liquid crystal layer is sealed by a sealing member that bonds the substrates 11 and 12 together. On the liquid crystal layer side of one substrate 11, a pixel electrode, a TFT, a wiring, and the like are formed. In addition, on the liquid crystal layer side of the other substrate 12, a common electrode, a wiring, and the like are formed. In addition, on sides opposite to the liquid crystal layers of the substrates 11 and 12, polarizing plates 13 and 13 are fixed.

In addition, between the luminance device BL and the liquid crystal panel LCP, a light shielding sheet 25 that has adhesive layers on outer peripheral parts on both sides is included. The light shielding sheet 25 bonds and fixes the resin part 43, the luminance device BL, and the liquid crystal panel LCP.

As shown in FIG. 7, an edge of the metal plate 42 which rises approximately vertically from the bottom face is bent toward the side on which the liquid crystal panel LCP is housed (the inner side) so as to form an inner face 43a. The inner face 43a of the metal plate 42 is exposed with facing the end face 14 of the liquid crystal panel LCP in the thickness direction, and an exposed part of the conduction part 50 of the metal plate 42 is formed as an exposure part. The conduction part 50 is formed along the end face 14 of the liquid crystal panel LCP. The front end of the bent part of the metal plate 42 is penetrated into the resin part 43 that is formed to have a multi-leveled shape. By using the above-described structure, the metal 42 and the resin part 43 are not easily separated from each other and can be integrated together.

A height H1 from the metal plate 42 located at the bottom of the frame 41 to an end edge 51 of the conduction part 50 on the surface 15 side of the liquid crystal panel LCP is formed to be larger than a height H2 of the liquid crystal panel LCP from the metal plate to the surface 15 of the liquid crystal panel LCP. Accordingly, the end edge 51 of the conduction part 50 is formed to protrude to the viewing side from the surface 15 of the liquid crystal panel LCP.

Between the conduction part 50 and the liquid crystal panel LCP, for example, a gap K of about 0.2 mm is formed. In addition, to a bottom face 42b of the metal plate 42, a wiring having a ground electric potential is connected, and the conduction part 50 that is a part of the metal plate 42 is in a ground state. The bottom face 42b of the metal plate 42 may be brought into contact with a casing, which is not shown in the figure, having a ground electric potential. Moreover, a ground terminal of a driving circuit that is mounted in the electro-optical device may be brought into contact with the metal plate 42.

As shown in FIGS. 6 and 8, in the edge part of the liquid crystal panel LCP, an extension part 16 that is installed by extending the substrate 11 of the liquid crystal panel LCP is formed. In the extension part 16, for example, a terminal (not shown) to which an external connection substrate such as an FPC is connected and the like are disposed. In addition, a driving IC 17 that drives the TFT of the substrate 11 and the like is disposed in the extension part 16. An adhesive tape 18 that is formed by an insulation material is adhered to the driving IC 17, and a conduction sheet 19 as a protection member is fixed to the driving IC 17 by the adhesive tape 18. The conduction sheet 19 is, for example, formed of a material such as Al having conductivity and is disposed to cover the driving IC 17 of the extension part 16. The conduction sheet 19 is electrically connected to an end edge 42a of the metal plate 42 on the surface 15 side which is bent to the surface 15 side of the liquid crystal panel LCP by an adhesive agent having the conductivity and the like. in addition, the front end of the metal plate 42 which is bent to the surface 15 side of the liquid crystal panel LCP is penetrated into the resin part 43 in which the multi-leveled shape is formed.

As described above, edges of four sides that rise approximately vertically from the bottom face of the metal plate 42 are configured such that end edges 51 are formed to protrude from the surface 15 of the liquid crystal panel LCP on three sides and an end edge 42a is formed to bent to a position lower than the surface 15 of the liquid crystal panel LCP on one side.

The end edge 51 that protrudes from the surface 15 of the liquid crystal panel LCP may be configured on four sides, two sides, or only one side. In addition, the end edge 51 that protrudes from the surface 15 of the liquid crystal panel LCP may be configured in a part of one side. Furthermore, in order to prevent penetration of static electricity, the protruded end edge 51 may be configured to be bent to be covered with the surface 15 of the liquid crystal panel LCP with facing the end face of the electro-optical panel.

In addition, as shown in FIG. 6, in the resin part 43 of the frame 41, corner parts 43b and 43e located in four corners of the frame 41 are disposed. The corner parts 43b of the frame 41 on the side denoted by arrow E, as shown in FIG. 9, are formed to cover an intersection part of two sides that rise from the bottom face of the metal plate 42.

The corner parts 43b formed of a resin are formed on the inner side from the face of the metal plate 42 on the side (inner side) in which the liquid crystal panel LCP is housed in addition, a notch part 43c that is formed by notching the corner from the inner side is formed.

In addition, a protrusion part 43d is disposed toward the side of the outer periphery of the corner part 43b. The protrusion part 43d is formed to extend in one direction by using a same face as the bottom face of the metal plate 42 as its bottom face. In this embodiment, the protrusion part 43d is formed to extend in the direction of a shorter length side of the liquid crystal panel LCP.

In addition, similarly, the corner parts 43e of the frame 41 on the side denoted by arrow G, as shown in FIG. 10, are formed to cover an intersection part of two sides that rise from the bottom face of the metal plate 42. Between the two sides that intersect each other, one side is an end edge 51 of the conduction part 50, and the other side is an end edge 42a. Heights of the two sides are different from each other. The corner parts 43e are formed to cover the sides to have a same height.

The corner parts 43e formed of a resin are formed on the inner side from the face of the metal plate 42 on the side (inner side) in which the liquid crystal panel LCP is housed. In addition, a notch part 43f that is formed by notching the corner from the inner side is formed.

In addition, a protrusion part 43g is disposed toward the side of the outer periphery of the corner part 43e. The protrusion part 43g is formed to extend in one direction by using a same face as the bottom face of the metal plate 42 as its bottom face. In this embodiment, the protrusion part 43g is formed to extend in the direction of a shorter length side of the liquid crystal panel LCP.

In addition, the protrusion parts 43d and 43g may be provided so as to protrude in the thickness direction of the liquid crystal panel LCP from the bottom face of the metal plate 42.

The resin part 43 of the frame 41 may be formed of a conductive resin in such a case, the range of the frame 41 which has conductivity is widened, and accordingly, the path through which the static electricity SE flows can be increased.

In addition, as in the third embodiment, a conductive member having conductivity higher than the substrate of the surface of the liquid crystal panel LCP may be filled in the gap K between the conduction part 50 and the liquid crystal panel LCP.

As described above, when the liquid crystal panel LCP is installed to the frame 41, the end face 14 of the liquid crystal panel LCP is not brought into contact with the metal plate 42 and is brought into contact with the corner parts 43b or the corner parts 43e of the resin part. Accordingly, damage of the liquid crystal panel LCP such as cracks can be prevented.

In addition, since the static electricity from the corner parts of the liquid crystal panel LCP flows through the notch part 43c, cracks of the corner parts of the liquid crystal panel LCP can be prevented.

In addition, the size of the liquid crystal display device 103 in the direction of the longer length side becomes the size of the metal plate 42 located in the outermost peripheral position. Accordingly, the size of the liquid crystal display device 103 in the direction of the longer length side can be decreased, and thereby miniaturization of the liquid crystal display device 103 can be achieved.

Next, an operation of this embodiment will be described.

As shown in FIG. 7, static electricity SE that is discharged to the observation side of the liquid crystal display device 103 tries to penetrate into the surface 15 of the liquid crystal panel LCP. Here, on the inner side 43a of the resin part 43 disposed along the end face 14 of the liquid crystal panel LCP in the thickness direction, the conduction part 50 formed of a conductive material is disposed. The static electricity SE penetrates into the exposure part of the conduction part 50 which has conductivity higher than the liquid crystal panel LCP. Thus, the static electricity SE is led to the conduction part 50, and accordingly, it is possible to prevent penetration of the static electricity SE into the liquid crystal panel LCP and prevent damage of the liquid crystal panel LCP due to the static electricity SE.

In addition, the end edge 51 of the conduction part 50 which is located on the viewing side is formed to protrude to the viewing side from the surface 15 of the liquid crystal panel LCP which is located on the viewing side. Since static electricity can be easily penetrated into a neighbor part having high conductivity, the static electricity SE generated in the liquid crystal display device 100 on the viewing side is penetrated into the conduction part 50 that protrudes to the viewing side from the surface 15 of the liquid crystal panel LCP. The penetrated static electricity SE flows from the protruded conduction part 50 to the bottom face 42b of the metal plate 42. Then, the static electricity SE flows out to the wiring of a ground electric potential which is connected to the bottom face 42b of the metal plate 42. Accordingly, the static electricity SE generated in the liquid crystal panel LCP on the viewing side is led to be penetrated into the protruded conduction part 50, and thereby penetration of the static electricity SE into the liquid crystal panel LCP can be prevented in advance. In addition, even when a display window of a cellular phone is disposed on the surface 15 side of the liquid crystal panel LCP on the viewing side, the static electricity SE in the display window is penetrated into the conduction part 50 that protrudes to the viewing side, and the penetration of the static electricity SE into the liquid crystal panel LCP can be prevented in advance. In addition, since the conduction part 50 that protrudes to the viewing side from the surface 15 of the liquid crystal panel LCP is brought into direct contact with the display window of the cellular phone, mechanical external pressure added to the surface 15 of the liquid crystal panel LCP can be relieved even in a case where the mechanical external pressure is added to the display window of the cellular phone, and strength of the liquid crystal panel LCP for cracks can be improved.

The conduction part 50 may be configured not protrude to the viewing side from the surface 15 of the liquid crystal panel LCP. In such a case, discharge can easily occur in the frame by exposing the conduction part in the edge of the frame that is located on the surface side of the electro-optical panel.

In addition, the conduction part 50 is disposed on the inner face 43a of the resin part 43 of the frame 1 along the end face 14 of the liquid crystal panel LCP in the thickness direction. Accordingly, the thickness or width of the liquid crystal display device 103 is not increased due to the thickness T of the conduction part 50, and a screw and the like for fixing the liquid crystal panel LCP are not needed.

Thereby, the size and thickness of the liquid crystal display device 103 can be decreased, compared to a general case where a casing frame made of a resin and a metal member are separately provided and the casing frame and the metal member are fixed by using screws.

In addition, since the gap K is formed between the conduction part 50 and the liquid crystal panel LCP, the conduction part 50 and the liquid crystal panel LCP are insulated from each other. Accordingly, it can be prevented that the static electricity SE penetrated into the conduction part 50 is penetrated into the liquid crystal panel LCP.

In addition, the metal plate 42 is brought into contact with and connected to the ground electric potential so as to be grounded. Thus, the conduction part 50 that is a part of the metal plate is also grounded, and accordingly, the static electricity SE penetrated into the conduction part 50 can be transmitted to the outside of the liquid crystal display device 103.

In addition, as shown in FIG. 8, the driving IC 17 of the extension part 16 is covered with the conduction sheet 19, and thus, the static electricity SE that has been discharged in the edge part of the liquid crystal panel LCP is penetrated into the conduction sheet 19. Since the conduction sheet 19 and the driving IC 17 are insulated from each other by the adhesive tape 18 that is formed of an insulation material, it can be prevented that the static electricity SE penetrated into the conduction sheet 19 is penetrated into the driving IC 17. Accordingly, the driving IC 17 can be protected from being damaged due to the static electricity SE. Furthermore, the conduction sheet 19 is electrically connected to the end edge 42a of the grounded metal plate 42 so as to be grounded, and accordingly, the static electricity SE penetrated into the conduction sheet 19 can be transmitted to the outside of the liquid crystal display device 103. As a result, the driving IC 17 can be protected from being damaged due to the static electricity SE more assuredly.

In addition, for example, when the liquid crystal display device 103 is installed to an electronic apparatus such as a cellular phone, a configuration as shown in FIG. 13 is used.

A liquid crystal display unit 201 that is configured by the liquid crystal display device 103 or the like is connected to a circuit unit 205, and the circuit unit 205 is connected to a power supply unit 206. In addition, the liquid crystal display unit 201, the circuit unit 205, and the power supply unit 206 are connected to a wiring having a ground electric potential so as to be grounded.

As described above, the static electricity SE discharged to the observation side of the liquid crystal display device 103 is penetrated into the conduction part 30 and can be transmitted to the outside of the liquid crystal display device 103 through the metal plate 42.

In addition, the ground is wired as a metal plate, a jumper line, a cooper foil, or the like and is electrically connected by soldering, pressure bonding, screw fixing, or the like.

In addition, since the frame 41 is configured by the metal plate 42 and the resin part 43 and the metal plate 42 is insert-molded into the resin part 43, it is possible to improve mechanical strength of the frame 41 by reinforcing the resin part 43 by using the metal plate 42 and decrease the thickness of the frame 41 and the thickness of the liquid crystal display device 103. In addition, since the edge of the metal plate 42 is bent to the inner side, the strength of the edge of the metal plate 42 can be improved, whereby the mechanical strength of the frame 41 can be improved. In addition, the precision of the size of the metal plate 42 on the outer side of the frame 41 can be improved by bending the edge of the metal plate 42 to the inner side.

In addition, the corner parts 43b and 43e that are exposed to the inner side of four corners of the frame 41 are formed in the resin part. Thus, when the liquid crystal panel LCP is installed to the frame 41, the end face of the liquid crystal panel LCP is brought into contact with the corner parts 43b and 43e. Accordingly, the frame 41 and the end face of the liquid crystal panel LCP are brought into contact with not metal but a resin, and thereby damages such as cracks are not generated in the liquid crystal panel LCP.

In addition, the resin part 43 of the frame 41 has the protrusion parts 43d and 43g that protrude to the outer side of four corners of the frame 41. Accordingly, when the liquid crystal display device 103 is installed to an electronic apparatus or the like, the protrusion parts 43d and 43g serve to determine the position of the liquid crystal display device, and thereby assembly thereof can be performed in an easy manner.

As described above, according to the liquid crystal display device 103 of this embodiment, penetration of the static electricity SE into the liquid crystal panel LCP through the conduction part 50 is prevented. Accordingly, damage of the liquid crystal panel LCP due to the static electricity SE can be prevented. in addition, since the thickness T of the conduction part 50 does not have influence on the thickness of the liquid crystal display device 103, a liquid crystal display device 103 that can be formed much thinner than that of a general liquid crystal display device can be provided.

Electronic Apparatus

Next, a detailed example of an electronic apparatus having the liquid display device 100, 101, 102, or 103 described in the above-described embodiments will be described.

Figure 11A:
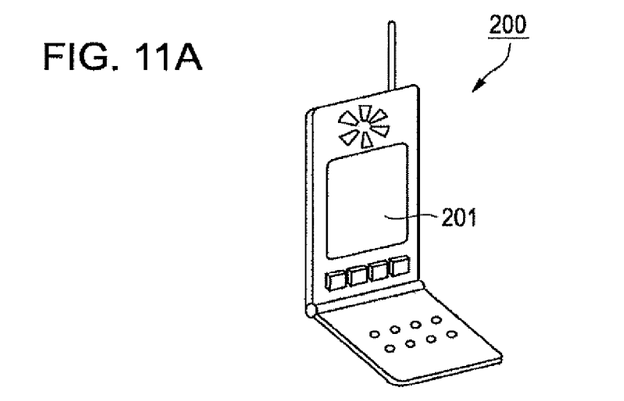
FIGS. 11A to 11C are schematic diagrams showing examples of electronic apparatuses according to embodiments of the invention.

FIG. 11A is a perspective view showing an example of a cellular phone. In FIG. 11A, reference numeral 200 denotes a main body of the cellular phone, and reference numeral 201 denotes a liquid crystal display unit including any one of the liquid crystal display devices 100, 101, 102, and 103 according to the above-described embodiments.

Figure 11B:
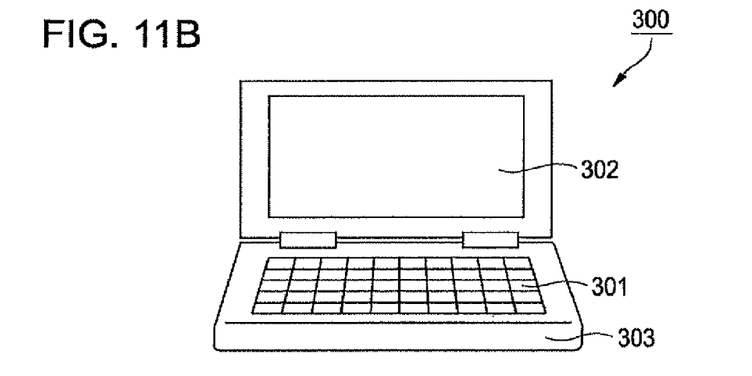

FIG. 11B is a perspective view of an example of a mobile information processing apparatus such as a word processor or a PC. in FIG. 11B, reference numeral 300 denotes the information processing apparatus, reference numeral 301 denotes an input unit such as a keyboard, reference numeral 303 denotes a main body of the information processing apparatus, and reference numeral 302 denotes a liquid crystal display unit including any one of the liquid crystal display devices 100, 101, 102, and 103 according to the above-described embodiments.

Figure 11C:
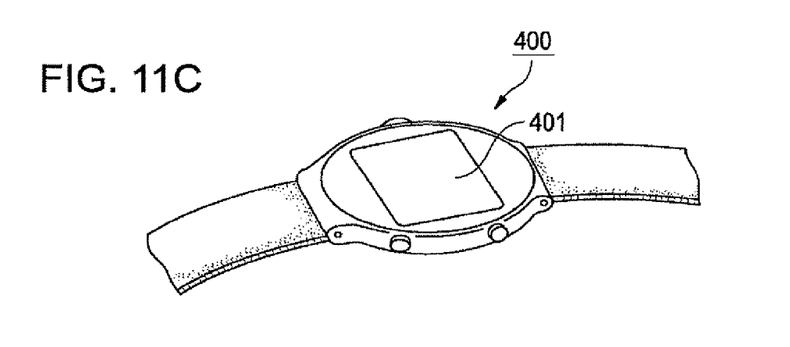

FIG. 11C is a perspective view showing an example of a wrist watch-type electronic apparatus. In FIG. 11C, reference numeral 400 denotes a watch main body, and reference numeral 401 denotes a liquid crystal display unit including any one of the liquid crystal display devices 100, 101, 102, and 103 according to the above-described embodiments.

Figure 12:
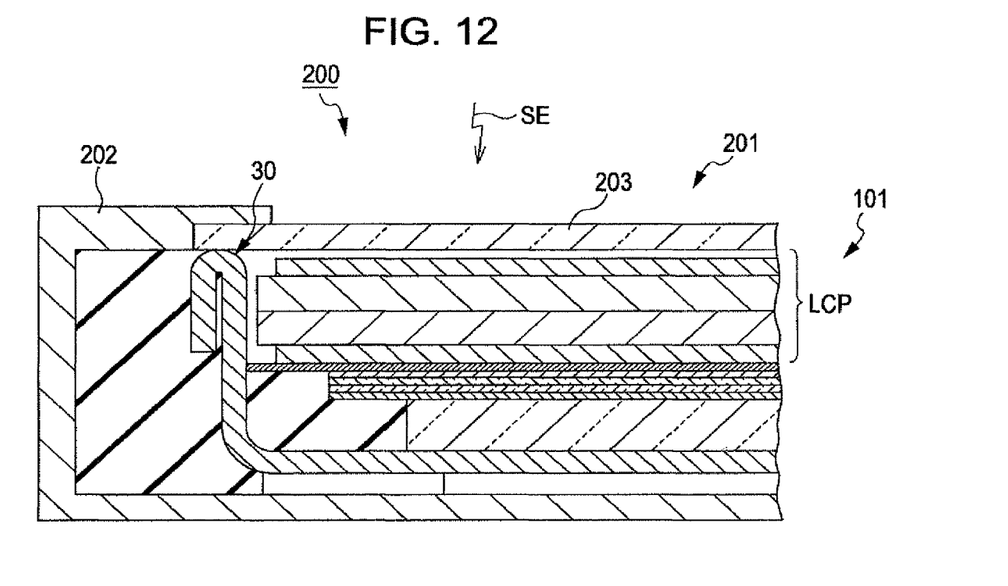
FIG. 12 is a cross-section view of major parts of an electronic apparatus according to an embodiment of the invention.

FIG. 12 is a cross-section view of major parts of the main body 200 of the cellular phone. FIG. 13 is a block diagram showing a schematic configuration of the cellular phone.

As shown in FIG. 12, in the main body 200 of the cellular phone, for example, the above-described liquid crystal display device 101 is housed in a casing 202. A liquid crystal display unit 201 of the casing 202 has a display window 203 that is formed of a transparent material such as glass. The display window 203 of the casing 202 is brought into contact with the end edge of a conduction part 30, which protrudes from the surface of a liquid crystal panel LCP, to be electrically connected to each other.

As shown in FIG. 13, the liquid crystal display unit 201 is connected to a circuit unit 205, and the circuit unit 205 is connected to a power supply unit 206. In addition, the liquid crystal display unit 201, the circuit unit 205, and the power supply unit 206 are connected to a wiring having a ground electric potential so as to be grounded. In addition, the ground is wired as a metal plate, a jumper line, a cooper foil, or the like and is electrically connected by soldering, pressure bonding, screw fixing, or the like.

For example, when a charged human body is in contact with the display window 203, the static electricity SE is led from the display window 203 to the casing 202 or the conduction part 30. Generally, the casing 202 is connected to a ground electric potential wiring, and accordingly, the static electricity led to the casing 202 side is led to the outside. In addition, the static electricity SE led to the conduction part 30 is lead to a ground electric potential wiring of the main body 200 of the cellular phone.

As described above, when the static electricity SE that is generated from the surface of the main body 200 of the cellular phone is penetrated into the liquid crystal display unit 201, the static electricity SE is led from the display window 203 to the conduction part 30 so as to be led to the outside.

In addition, also in the information processing apparatus 300 and the watch main body 400, similarly to the main body 200 of the cellular phone, the static electricity SE penetrated into the liquid crystal display units 302 and 401 can be lead to the outside by the conduction part 30.

As described above, the electronic apparatuses 200, 300, and 400 shown in FIGS. 11A to 11C can be prevented from being damaged due to the static electricity SE, and the liquid crystal display devices 100, 101, and 102 that can be formed to be thinner than a general device are mounted therein. Consequently, according to the above-described electronic apparatuses 200, 300, and 400, the damage due to the static electricity SE can be prevented, and thereby the electronic apparatuses 200, 300, and 400 that are formed to be thinner than a general apparatus can be provided.

The present invention is not limited to the above-described embodiments, and various changes in forms can be made therein without departing from the gist of the invention.

For example, in the above-described embodiment, the conduction part is configured as a bending part of the metal plate constituting the bottom part of the frame. However, the conduction part may be a flat plate other than the bottom part, as long as the conduction part is disposed on the inner face of the frame along the direction of the thickness of the electro-optical panel. Furthermore, the conduction part may be in the shape of a mesh, a rod, or a reed and a conductive member may be filled therein.

In addition, although a case where a gap between the end face of the liquid crystal panel and the conduction part is formed has been described in the above-described embodiments, however, the end face of the liquid crystal panel and the conduction part may be brought into contact with each other. In such a case, the static electricity accumulated in the liquid crystal panel can be efficiently transmitted to the conduction part.

In addition, although the electronic apparatuses according to the above-described embodiments are configured to include a liquid crystal device, however, the electronic apparatuses may include different types of electro-optical devices such as an organic electroluminescence display device or a plasma-type display device.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:
1. An electro-optical device comprising:
a frame including a side plate; and
an electro-optical panel that is housed in an inner side of the frame, the electro-optical panel including
peripheral areas along first, second, third, and fourth different sides of the electro-optical panel, the first and third sides on opposite sides of the electro-optical panel, and the second and fourth sides on opposite sides of the electro-optical panel, the peripheral areas including a first peripheral area on the first side, a second peripheral area on the second side, a third peripheral area on the third side, and a fourth peripheral area on the fourth side,
a driving circuit is disposed in the first peripheral area,
a liquid crystal layer, and
a polarizing plate disposed on a top surface of a viewing side of the electro-optical panel,
wherein the side plate is disposed at least along a side surface of the electro-optical panel,
wherein an insulation member is disposed between the side plate and the side surface of the electro-optical panel in such a manner that the insulation member is in direct contact with the side plate,
wherein the insulation member is disposed in the second peripheral area and the fourth peripheral area that are opposed to each other and that cross the first peripheral area in which the driving circuit is disposed, and the insulation member is excluded from the first peripheral area in which the driving circuit is disposed,
wherein the side plate includes a first facing surface that faces a part of the side surface of the electro-optical panel which includes opposed first and second substrates, with the liquid crystal layer being positioned therebetween,
wherein the insulation member includes a second facing surface that faces the side plate, and
wherein the second facing surface of the insulation member is in direct contact with the first facing surface of the side plate, the first facing surface facing the side surface of the first substrate and the second substrate.
2. The electro-optical device according to claim 1,
wherein a top portion of the side plate is in contact with a cover glass and is higher than the electro-optical panel.
3. The electro-optical device according to claim 1, wherein the side plate is exposed in an edge of the frame.
4. The electro-optical device according to claim 1,
further comprising a conductive protection member that covers at least a part of the driving circuit,
wherein the driving circuit drives the electro-optical panel, and provided on an extension part of the second substrate that extends beyond areas of the first substrate and the liquid crystal layer, and
wherein the protection member is connected to the side plate of the frame.
5. An electronic apparatus comprising the electro-optical device according to claim 1.
6. The electronic apparatus according to claim 5, further comprising a casing that houses the electro-optical device, wherein the electro-optical device is brought into contact with the casing through the side plate.
7. The electro-optical device according to claim 2,
wherein an edge of the side plate, outside of the first facing surface, is bent toward the cover glass, and toward opposite the insulation member, to a position lower than the cover glass.

8. The electro-optical device according to claim 7,
wherein the driving circuit is disposed in an extension part of the electro-optical panel, and provided on an extension part of the second substrate that extends beyond areas of the first substrate and the liquid crystal layer, and
wherein the electro-optical panel further comprises a conduction sheet that covers the driving circuit and is electrically connected to the edge of the side plate bent toward the cover glass to the position lower than the cover glass.
9. The electro-optical device according to claim 1, wherein the frame further includes a first side part that is formed by bending the side plate and a second side part that is formed by bending the side plate a second time away from the electro-optical panel side.
10. The electro-optical device according to claim 9,
wherein a resin part may be disposed on corners of the frame, and
wherein an upper edge of the side plate bent between the first side part and the second side part is flush with an upper surface of the resin part.
11. The electro-optical device according to claim 1,
wherein the side plate includes a bottom part and four sides that rise from the bottom part, and
wherein each of three of the sides include a facing part that faces a part of the side surface of the electro-optical panel.
12. The electro-optical device according to claim 11,
wherein the second substrate includes an extension part having the driving circuit mounted thereon, the extension part extending beyond areas of the first substrate and the liquid crystal layer.
13. The electro-optical device according to claim 1,
wherein the driving circuit is disposed in an extension part of the electro-optical panel, and provided on an extension part of the second substrate that extends beyond areas of the first substrate and the liquid crystal layer,
wherein the electro-optical panel further includes:
a conduction sheet that covers the driving circuit and is electrically connected to the edge of the side plate bent toward a cover glass to the position lower than the cover glass; and
an adhesive tape that is formed of an insulation material and disposed between the driving circuit and the conduction sheet, and
wherein the conduction sheet and the driving circuit are insulated from each other by the adhesive tape.
14. An electro-optical device comprising:
a frame including a side plate; and
an electro-optical panel that is housed in an inner side of the frame, the electro-optical panel including
peripheral areas along first, second, third, and fourth different sides of the electro-optical panel, the first and third sides on opposite sides of the electro-optical panel, and the second and fourth sides on opposite sides of the electro-optical panel, the peripheral areas including a first peripheral area on the first side, a second peripheral area on the second side, a third peripheral area on the third side, and a fourth peripheral area on the fourth side,
a driving circuit is disposed in the first peripheral area,
a liquid crystal layer, and
a polarizing plate disposed on a top surface of a viewing side of the electro-optical panel,
wherein the side plate is disposed at least along a side surface of the electro-optical panel, wherein an insulation member is disposed between the side plate and the side surface of the electro-optical panel in such a manner that the insulation member is in direct contact with the side plate, wherein the insulation member is disposed in the second peripheral area and the fourth peripheral area that are opposed to each other and that cross the first peripheral area in which the driving circuit is disposed, and the insulation member is excluded from the first peripheral area in which the driving circuit is disposed, and wherein the insulation member is in direct contact with an upper surface of the first substrate and a lower surface of the second substrate.

15. The electro-optical device according to claim 14, wherein the insulation member is in direct contact with the polarizing plate disposed on the top surface of the viewing side of the electro-optical panel.

\* \* \* \* \*